United States Patent
Clark

(10) Patent No.: US 8,057,210 B2
(45) Date of Patent: Nov. 15, 2011

(54) MOULD INSERT

(75) Inventor: Roger William Clark, Labrador (AU)

(73) Assignee: Visy R & D Pty Ltd, Southbank, Victoria (AU)

( * ) Notice: Subject to any disclaimer, the term of this patent is extended or adjusted under 35 U.S.C. 154(b) by 318 days.

(21) Appl. No.: 12/431,897

(22) Filed: Apr. 29, 2009

(65) Prior Publication Data
US 2010/0278961 A1 Nov. 4, 2010

(51) Int. Cl.
*B29C 49/48* (2006.01)
(52) U.S. Cl. .................. 425/182; 425/522; 425/541
(58) Field of Classification Search .......... 425/182, 425/522, 541
See application file for complete search history.

(56) References Cited

U.S. PATENT DOCUMENTS

| | | | |
|---|---|---|---|
| 4,911,632 A * | 3/1990 | Mansfield | 425/183 |
| 5,308,234 A * | 5/1994 | Nicke et al. | 425/188 |
| 5,750,161 A * | 5/1998 | Schock et al. | 425/468 |
| 7,037,099 B2 | 5/2006 | Linke et al. | |
| 7,267,537 B2 * | 9/2007 | Mitchell et al. | 425/182 |
| 2011/0027409 A1 * | 2/2011 | Stoiber et al. | 425/526 |

FOREIGN PATENT DOCUMENTS

FR 2720680 A1 * 12/1995
WO WO 2009156699 A2 * 12/2009

OTHER PUBLICATIONS

Mechanical translation of FR 2720680 A1 dated Dec. 1995 obtained from the espace.net website.*

* cited by examiner

*Primary Examiner* — Robert B Davis
(74) *Attorney, Agent, or Firm* — Rothwell, Figg, Ernst & Manbeck, P.C.

(57) ABSTRACT

A mould member 1 for blow moulding plastic containers, comprising an outer shell 2 supporting a sidewall mould insert 2, and a base mould insert 5 having the required shape features 7 of the body and base of the container to be moulded, the base mould insert being mounted on a base member by cooperating locking means 9, 10 engageable by a tool 17 for quick release by manipulations of the tool.

5 Claims, 2 Drawing Sheets

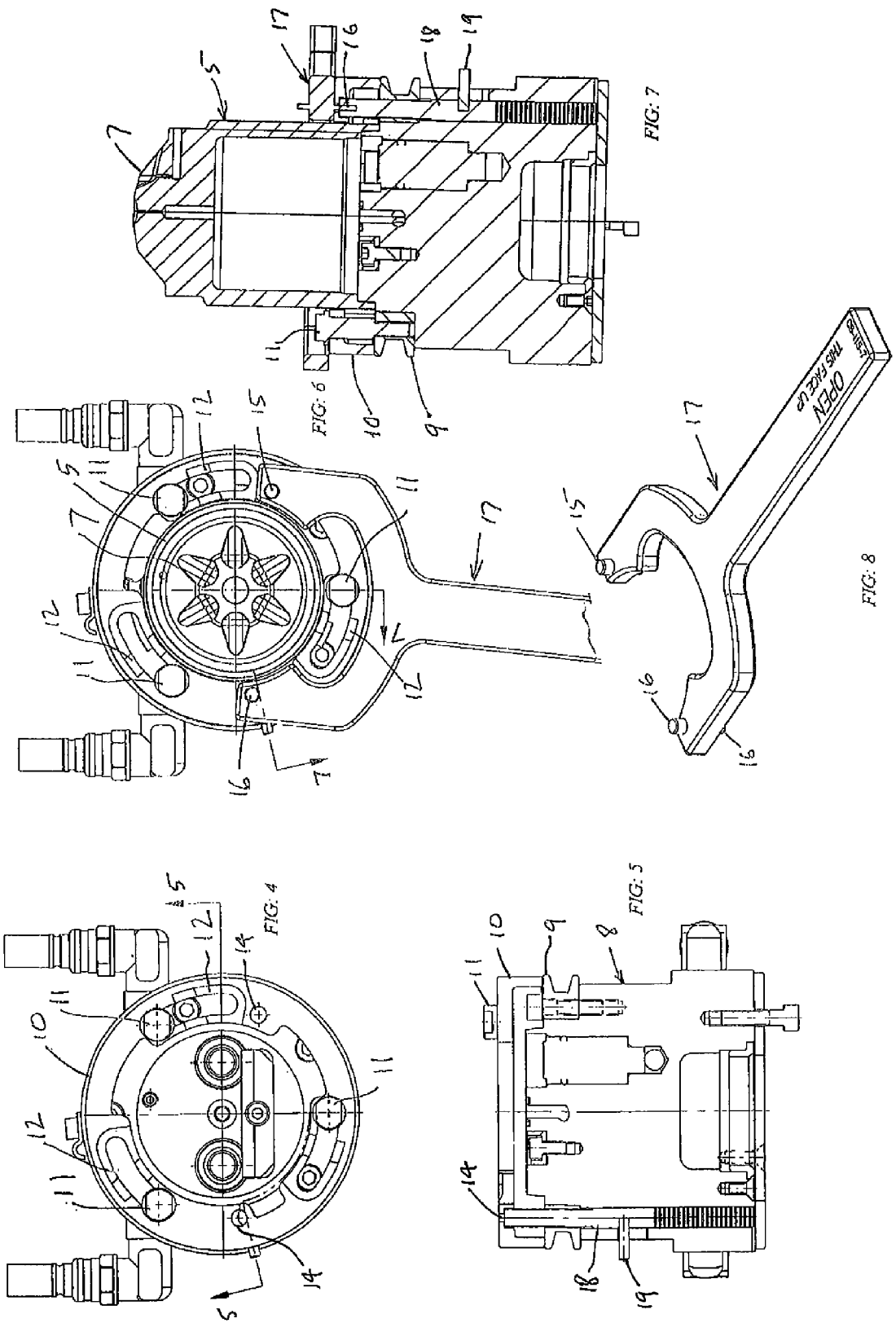

MOULD INSERT

This invention relates to mould inserts for use in the blow moulding of plastic bottles.

To avoid the cost of replacing complete moulding shell halves, the use of removable inserts defining the required body shape and base shape have been successful for some time. One such arrangement is illustrated in U.S. Pat. No. 6,113,377, Clark.

The base insert is held in place by means of bolts. When an insert change is required for a different body or base shape or size, the base insert must be released and replaced by unscrewing and replacing the bolts. This is a time-consuming operation given that multiple moulds may need to be changed.

It is an object to provide a base insert holding means which is adapted for rapid release and replacement.

The invention therefore provides a mould member for blow moulding plastic containers, comprising an outer shell supporting a sidewall mould insert, and a base mould insert having the required shape features of the body and base of the container to be moulded, the base mould insert being mounted on a base member by cooperating locking means engageable by a tool for quick release by manipulation of the tool.

The cooperating locking means may comprise cooperating locking rings, one of which is enagageable by said tool for quick release by manual rotation of the tool.

The cooperating locking rings may comprise a fixed locking ring and a retainer ring engageable with means carried by the locking ring.

The retainer ring may be held in place by bolts engaging slots in the retainer ring having cammed locking faces to ensure secure locking of the retainer ring.

The locking rings may normally be locked together by a locking device engaging both rings until said one locking ring is released by a release means on the tool.

The locking means may comprise a spring loaded pin engaging apertures in said locking rings.

The tool may be provided with a release pin which releases the spring loaded pin from engagement with said one locking ring when the tool is properly engaged with said one locking ring.

The spring loaded pin may carry an indicator pin which provides a visual indication of the locked state of the locking pin.

In order that the invention may be more readily understood, an embodiment will now be described with reference to the accompanying drawings in which:

FIG. 4 is a top view of a base insert holding means;

FIG. 5 is a sectional elevation taken along the line 5-5 in FIG. 4;

FIG. 6 is a top view showing the removal tool in place;

FIG. 7 is a sectional elevation along the line 7-7 in FIG. 6; and

FIG. 8 is an isometric view of the removal tool of FIG. 5.

Figure 1:
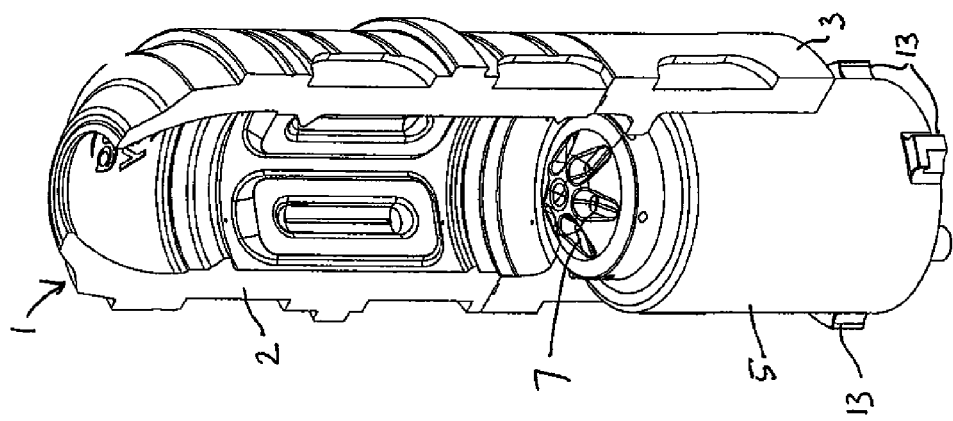
FIG. 1 is an isometric view of a blow mould half shell insert and a base insert assembly.
Figure 2:
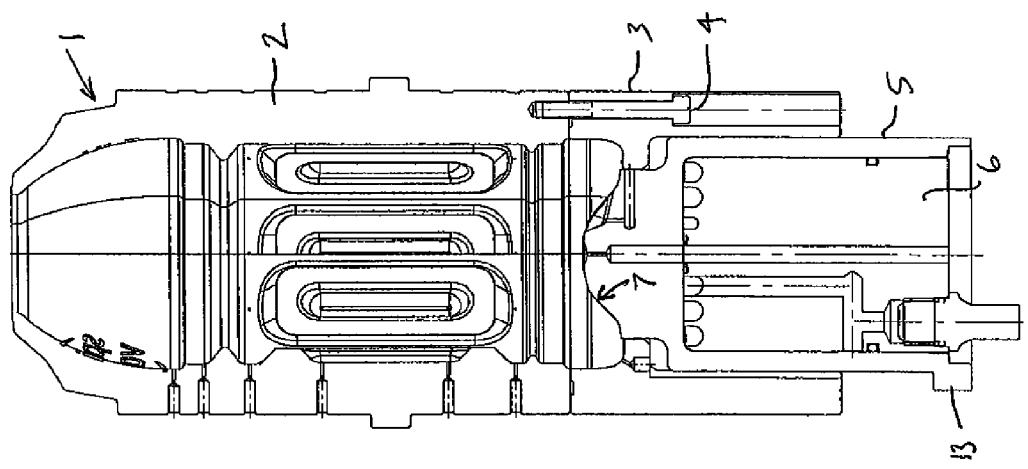
FIG. 2 is a front elevation of the assembly of FIG. 1.
Figure 3:
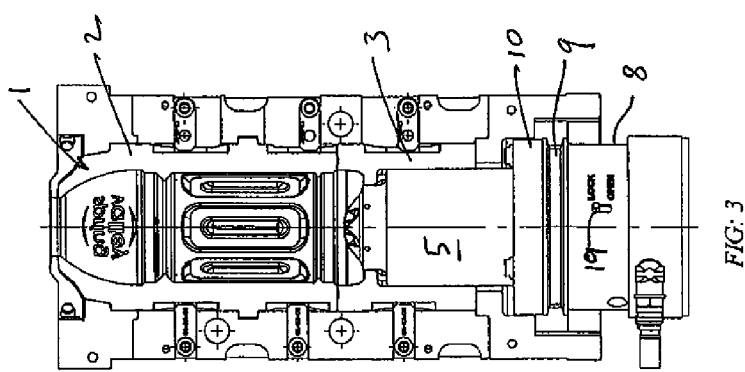
FIG. 3 is a front elevation of the half shell insert of FIG. 1 in position in a half mould body.

Referring to FIGS. 1 and 2 of the drawings, the half mould insert assembly 1 comprises an upper shell insert 2 having the required shape features of the body of the bottle, and a lower shell insert 3 defining the shape of the heel of the base of the bottle, secured to the upper insert 2 by means of screws 4. The mould assembly is completed by a base insert 5 received within the lower shell insert 3 and closed by a base plug 6, and having the base mould features 7 at its upper end.

The base insert 5 is secured to a base stem fitting 8 by means of an annular locking ring 9 and an associated retainer ring 10 held together by bolts 11 engaging cammed slots 12 in the retainer ring 10 and engaging holding lugs 13 at the lower end of the insert 5. The locking ring 9 has spaced pin holes 14 adapted to receive pins 15 and 16 on a removal tool 17. Pin 16 is longer than pin 15 to depress a spring loaded locking pin 18 from engagement with the retainer ring 10, which normally prevents rotation of the ring during operation of the mould. An indicator pin 19 secured to the locking pin 18 provides a visual indication that the ring 10 is locked ready for operation of the mould.

It will be appreciated that the base insert is able to be released for replacement by simple rotation of the tool 17 thereby allowing for rapid changeover of mould inserts. Since the mechanisms for retaining the upper and lower shell inserts in place and the means for supplying fluids to the mould in the usual manner are known and are not directly relevant to the invention, they will not be further described.

The invention claimed is:

1. A mould member for blow moulding plastic containers comprising an outer shell supporting a sidewall mould insert, and a base mould insert having the required shape features of the body and base of the container to be moulded, the base mould insert being mounted on a base member by cooperating locking rings, one of which is engageable by a tool for quick release by manipulation of the tool, wherein the locking rings are normally locked together by a locking device engaging both rings until said one locking ring is released by a release means on the tool, wherein the locking means comprises a spring loaded pin engaging apertures in said locking rings.

2. The mould member of claim 1, wherein the cooperating locking rings comprise a fixed locking ring and a retainer ring engageable with means carried by the locking ring.

3. The mould member of claim 2, wherein the means carried by the locking rings comprises bolts engaging slots in the retainer ring having cammed locking faces to ensure secure locking of the retainer ring.

4. The mould member of claim 1, wherein the tool is provided with a release pin which releases the spring loaded pin from engagement with said one locking ring when the tool is properly engaged with said one locking ring.

5. The mould member of claim 1, wherein the spring loaded pin includes an indicator pin which provides a visual indication of the locked state of the locking pin.

* * * * *